June 1, 1954 W. J. BLAZEK 2,679,772
WET REAMER
Filed May 10, 1949
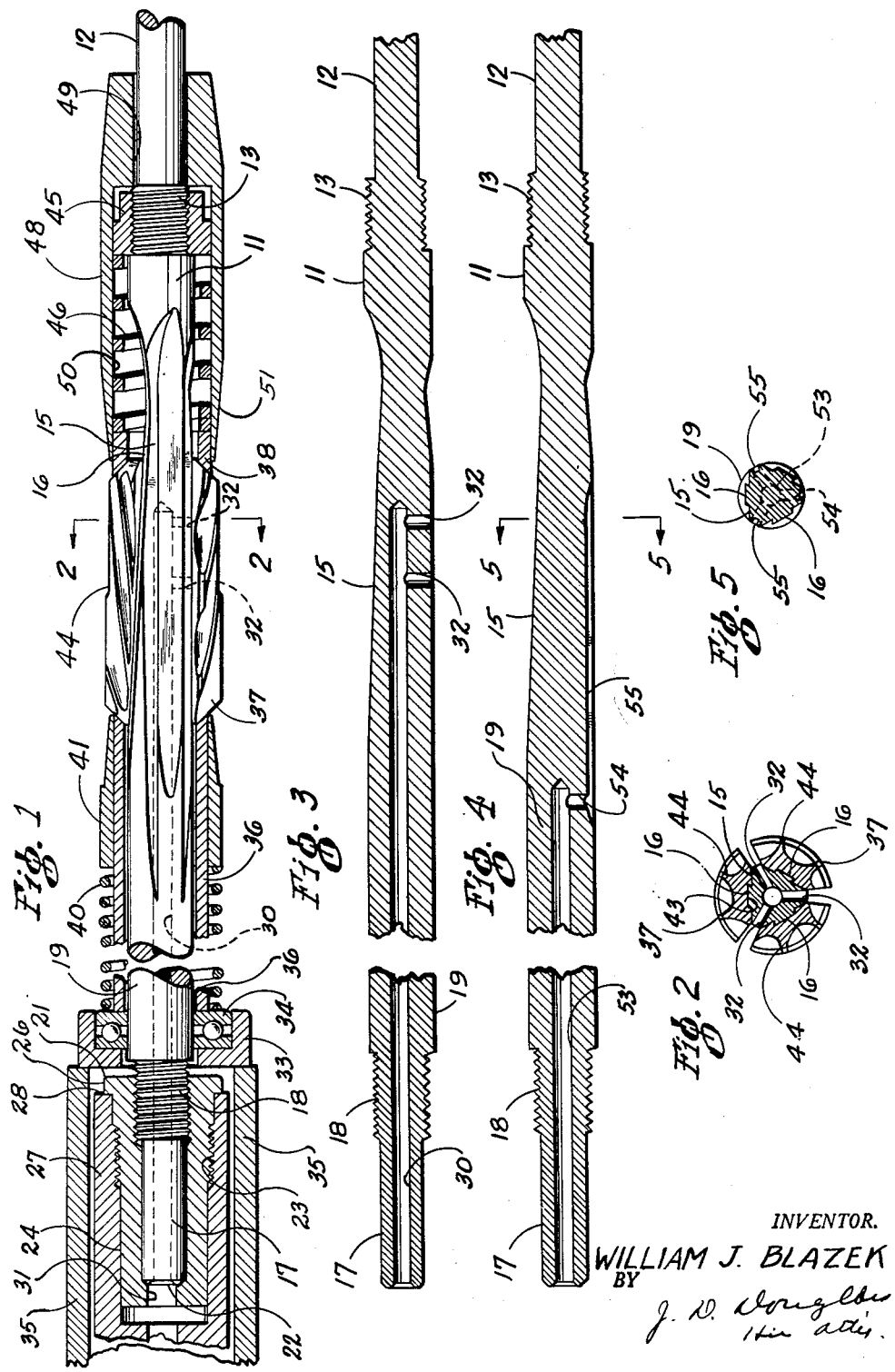
INVENTOR.
WILLIAM J. BLAZEK Patented June 1, 1954

2,679,772

UNITED STATES PATENT OFFICE 2,679,772

WET REAMER

William J. Blazek, New Lexington, Ohio, assignor to Lempco Products, Inc., Bedford, Ohio, a corporation Application May 10, 1949, Serial No. 92,467

6 Claims. (Cl. 77—75)

This invention relates to reaming tools and more specifically to an internally cooled and lubricated expansion type reamer adapted to be adjusted while in operation on a machine.

In automotive and other engine repair work, it is frequently necessary to ream a bearing or bushing accurately to a given size with as smooth a surface as possible. Since these sizes vary in small increments, a reaming tool has been developed which is capable of expansion between limits by adjustment of a screw thread which slides the reaming cutters along a taper on a shank of the tool. This adjustment was possible only where the tool was not being turned in the machine, and it was not possible to graduate the device so that a known diameter could be reamed. In addition, any cooling or lubricating fluid used on the tool had to be introduced from without the work and usually merely ran down the surface of the work or the tool and perhaps into the hole being reamed.

My invention eliminates many of these difficulties. I provide a reaming tool for use with a power machine of a certain type described in a copending application by Smole et al. Ser. No. 744,692, filed April 29, 1947, which has a longitudinally adjustable sleeve surrounding the rotating driving members. My reamer utilizes this adjustment to move the cutters on the tapered shank to allow very accurate adjustment of the tool to a given diameter while the tool is being rotated, which, in turn, allows successively larger diameters to be reamed until the desired diameter is reached without stopping the tool.

Furthermore, by my invention, a much smoother surface of the hole being reamed is obtained because the lubricant and cooling fluid is discharged from the tool itself directly on the cutting edges and on the work being done. A further advantage is realized because the lubricant can be made to carry the chips away from the surface being reamed.

In addition, I have provided a tool which by reason of the shape of the cutter requires fewer adjustments to attain a give diameter hole.

Further advantage is gained because the tool of my invention is more adequately cooled and, therefore, higher cutting speed is possible.

Still further advantages of my invention and the invention itself will be made apparent in the following description and the drawings which form a part of this specification.

In the drawings:

Fig. 1 is a view of an embodiment of my device partly in section showing the fully assembled tool;

Fig. 2 is a sectional view taken along line 2—2 of Fig. 1;

Fig. 3 is a longitudinal section of the shaft of my first embodiment showing the lubricant passages;

Fig. 4 is a view similar to Fig. 3 showing an alternative form of my device;

Fig. 5 is a sectional view taken along line 5—5 of Fig. 4.

Briefly, my invention comprises an improvement to a reaming tool which allows me to use it with the machine of the aforementioned application, Ser. No. 744,692 which enables me to adjust the reamer to a specified diameter while the machine is operating and to lubricate and cool the tool internally. To accomplish this end, I provide a tool with a central shaft similar to previous adjustable reamers except that the driving end is formed for attachment with the specific machine mentioned above. The shaft has tapered cutter seats similar to previous shafts but has a hole drilled from the driving end centrally into the tapered portion for coolant and lubricant. Radial holes extend outwardly from this central hole between the cutter seats to allow the coolant to flow onto the cutters directly. Means engaging the adjustable sleeve of the driving machine is also provided to allow adjustment of the reamer while in operation. In addition, I provide a new type cutter which reduces the number of adjustments necessary to accomplish a certain enlargement of a hole and a guide for the work which holds it properly aligned.

More specifically and as illustrated by the figures throughout which like parts are designed by like reference characters, my invention is a reaming tool having a central shaft 11. This shaft is formed from a cylindrical blank having a uniform diameter. A pilot shaft 12 of reduced diameter is accurately machined at one end of the blank. Adjacent to the pilot, I provide threads 13 for a purpose to be described hereinafter. The central part of the shaft which I prefer to call the shank is machined to provide a series of sloping flat surfaces 15 having raised ways 16 formed thereon. It will be appreciated that while I have shown a shank having three flat surfaces 15 and a straight taper upward from the pilot end, still the shank could have more or less than three surfaces and could taper in the opposite direction without departing from the scope of my invention.

The other end of the shaft which I prefer to call the driving end is formed for engagement with the driving machine. This requires a straight end portion 17 of reduced diameter and a set of screw threads 18 adjacent thereto on the larger diameter. Beyond these threads, the original diameter is retained for a space 19 which then fades into the tapered shank portion previously described.

In order for the shaft 11 to engage the driving machine, it may be necessary to provide an adapter bushing 21 as shown in Fig. 1. The threads 18 are screwed into the bushing until the end surface 22 of the shaft bottoms in the bushing to form a fluid-tight seal. The bushing in turn is formed somewhat similarly to the shaft driving end having threads 23 and a reduced diameter straight portion 24. It may also have a flange 26 which, when the bushing is threaded into the rotating driving member 27, forms a fluid tight seal with the outer edge 28 of the driving member for reasons to be made clear hereinafter. It is apparent that for larger sizes of reamers the bushing 21 may not be necessary since the shaft will be threaded directly into the driving member 27.

A hole 30 is drilled centrally of the shaft from the driving end to about the mid portion of the tapered shank. This hole along with an opening 31 in the base of the bushing 21 forms a continuous fluid tight passage from the center of the driving member 27 to the interior of the shank of the reaming tool. Small holes 32 drilled radially from the surface of the shaft at points between the flat surfaces 15 intersect this passageway. As described in the aforementioned application, Ser. No. 744,692, a coolant and/or lubricant fluid is delivered to the central opening in the driving member 27 under pressure. Because of the connecting ducts formed through the bushing and the shaft, this fluid will be conducted out to the surface of the shaft where it will discharge onto the work piece into which the reamer is inserted. Thus, it serves to cool the tool internally and, at the same time, delivers a lubricant directly to the surface being cut.

Surrounding the straight portion 19 of the shaft, I provide a cup shaped retainer 33 which holds a thrust bearing 34 which may be of the ball bearing type. This retainer 33 is of such diameter that it extends beyond the rotating driving member 27 and is therefore adapted to engage the adjustable sleeve 35 of the driving machine which surrounds the driving member. The retainer 33 and bearing 34 are therefore adapted to be moved longitudinally of the shaft adjustably by the sleeve 35. A bushing 36 abuts the thrust bearing 34 and is slidably disposed on the shaft to transmit this adjustment to the cutters 37 which are slidably journalled on the ways 16. A similar bushing 38 engages the cutters at their other ends. Each of these bushings has an internal chamfer for engaging the cutter for reasons hereinafter explained. A coil compression spring 40 which urges a work guide 41 away from the bearing also abuts the bearing 34. This guide is slidably disposed on the bushing 36 and is formed with a long tapered outer surface on which the work piece may center itself to be guided thereby. The spring 40 serves to keep the guide 41 in firm but yieldable contact with the work piece.

The cutters 37 which are engaged on each end by the bushings 36 and 38 are slidably disposed on the ways 16 having slots cut in their under surfaces 43 to match the shape of these ways. Each cutter is chamfered at the ends where it is engaged by the bushings. Since these is some pressure on these bushings, tending to push them together or towards the cutters, the chamfer serves to hold the cutters in contact with the ways. In order that a straight hole may be reamed by the cutters, the surface 43 is formed with a taper to match that of the shank while the cutting surfaces 44 may form a true cylinder as in the ordinary expansion reamer. However, in my tool, I prefer to form my cutters in a novel way. Since most of the cutting is done as the tool enters the work, i. e., by the edges of the tool as it enters, I form my cutters in steps. This is shown best in Fig. 1, where, for purpose of illustration, I have shown only two steps the difference in diameter of which has been greatly exaggerated. There may be more steps, however, dependent in part on the length of the cutters. The actual differences in diameter of the cutter steps, I have found for best results should be on the order of .002 to .004 inch. The cutting edges of each step are true circular cylinders so that the hole reamed out will be true, but since the steps are successively larger, fewer passes of the work over the reamer are necessary to accomplish a required enlargement of the hole being reamed and, therefore, fewer adjustments of the cutters are necessary.

Since the radial holes 32 extend between the flat surfaces 15 of the shaft, and therefore between the cutters 37, the lubricating and cooling fluid discharged from them will be deposited not only on the work piece but also on the cutter part immediately following the hole as the reamer is rotated. It has been found that such lubrication makes possible a much finer finish than has been previously possible.

A nut 45 threaded onto the threads 13 of the shaft forms a stop means for a spring 46 engaged between the nut 45 and the bushing 38. This spring 46 is always under some compression and therefore, the bushing 38 always presses the cutters toward the driving end in a direction to expand them if the taper of the shank is as shown in the figures. Any movement of the adjustment sleeve 35 toward the pilot end which is necessarily transmitted to the cutters is opposed by this spring 46.

A second work guide 48 is slidably disposed on the pilot shaft 12 for a portion 49 of its length. The rest of the guide has an enlarged inner opening 50 adapted to surround the nut 45, the spring 46, and the bushing 38. The outer surface has a taper 51 similar to the outer surface of the spring loaded guide 41 for engaging the work piece. In addition, the outer surface may be knurled or otherwise adapted to be grasped by the hand of the operator to push the work piece onto the cutters.

In operation, the shaft, with the adapter bushing 21, the cutters 37 and cutter engaging bushings 36 and 38 and the means connected therewith including the spring loaded work guide properly assembled thereon, is screwed into the driving member 27. The sleeve 35 may then be adjusted from the driving machine so that the reamer cutters 37 will ream the proper size hole or will readily fit into the hole desired to be reamed out. This adjustment need not be made at this time, however, since the sleeve is adjustable at all times during the cutting operations or while stationary. The machine may then be started and the work piece placed over the tool. The work piece is kept from rotating by means on the driving machine (not shown) and is pressed toward the driving end by the hand grasped work guide 48. Any further adjustments of the cutters can be made, while the machine is running and the reaming tool rotating, simply by adjusting the sleeve in the machine. Since this adjustment in the machine is graduated, it is possible to adjust the reamer to a predetermined diameter. During the operation of the machine, a cutting oil or other cooling or lubricating fluid passes through the passageway provided by the opening 31, central hole 30, holes 31, to cool the tool allowing higher cutting speeds. This fluid is discharged from the radial holes 31 onto the cutting edges and the work piece and lubricates the cutting directly and positively since it is ducted directly to the point where it is needed.

An alternative form of my invention is shown in Figs. 4 and 5. The difference between this embodiment and the one previously described is that, instead of long central hole 30 in the shaft 11, I provide a shorter central hole 53 with intersecting radial holes 54 near the end thereof. These radial holes like those described before (the holes 32) extend from a position on the surface which would be between the flat surfaces 15 on the shaft, were these surfaces to be extended. However, the holes 54 are drilled in the portion 19 of the shaft. Slots 55 extend longitudinally from these radial holes 54 along the spaces of the shaft between the flat surfaces 15 outward to a point where they nearly break through these surfaces. The bushing 36 and the shaft 11, in this embodiment, are accurately made so that as little clearance as practicable is left between them as assembled. Thus, I provide passages for the fluid through the hole 53, radial holes 54 and slots 55 to the end of the bushing 36. Since this bushing extends to the cutters, the fluid is therefore discharged on the cutter from where it is dispersed completely over the cutter. While this is not as efficient as the distribution in the prior described embodiment, it is still advantageous over previous expansion reamers since it deposits the fluid on the cutters although not directly on the work.

Thus, it is apparent that I have provided a novel reaming tool which, by its operation, will finish a hole with a better finish more accurately and more quickly because it is positively lubricated, better guided, and because adjustments to the tool can be made while it is in operation.

Having thus described my invention, I am aware that numerous changes and departures may be made therefrom without departing from the spirit or scope thereof.

I claim:

1. A reaming tool of the expanding type, adapted to be driven by a rotating driving means which has a reciprocable sleeve disposed thereabout, comprising a central shaft having one end adapted for driving engagement with said driving means, tapered surfaces at the midportion, screw threads at one end of said midportion and a pilot portion formed on the other end, reamer cutters adapted for engagement with said tapered surfaces, a bushing surrounding said shaft abutting said cutters, a nut on said screw threads, a spring surrounding said shaft engaged between said nut and said bushing to urge said cutters toward the driving end, work guiding means slidably and rotatably journalled on said pilot portion and surrounding said spring and nut and having tapered ends for aligning engagement with the work piece, a second bushing slidably disposed on said shaft abutting the other end of said cutters, a bearing retainer slidably disposed on the shaft in reciprocatory driven engagement with said sleeve, a thrust bearing disposed in said retainer between said retainer and said second bushing, and second work guiding means slidably journalled on said second bushing urged into guiding engagement with the work piece by a spring engaged between said last named guiding means and said thrust bearing.

2. An expanding reamer adapted to be driven by driving means including a central rotating drive member having a reciprocable sleeve disposed thereabout, said reamer comprising a shaft having a driving end for engagement with said central drive member, a midportion having a plurality of angularly displaced tapered surfaces, screw threads spaced longitudinally from said tapered surfaces, and a pilot guide portion, a plurality of cutters seated on said tapered surfaces, stop means threadably mounted on said screw threads, resilient means between said stop means and said cutters to urge said cutters toward said driving end, adjustment means engaging the other side of the cutters to hold said cutters adjustably in position, work piece guiding means surrounding said adjusting means adapted to engage the inside surface of a hole in the work piece as it moves across the cutters, spring means engaging said guiding means urging it toward said cutters, second guiding means slidably and rotatably journalled on said pilot guide portion and surrounding said resilient means and said stop means disposed to engage the inner surface of the hole in the work piece as it moves onto said cutters.

3. For use with a machine having a rotating driving member and a reciprocable sleeve disposed thereabout, a reaming tool comprising a central shaft having a driving end adapted for driven engagement with said driving member, a tapered shank section adjacent said driving end and stop means adjacent said shank opposite to said driving end, cutters slidably disposed on said shank, spring means surrounding said shaft engaging said stop means to urge said cutters toward the driving end, bushing means surrounding said shaft at the driving end, and thrust bearing means engaged between said bushing and said reciprocable sleeve to transmit longitudinal force from said machine to said cutters to urge them against said spring thereby providing for freedom of rotation between said bushing means and said sleeve.

4. For use with a machine having a rotating driving member and a non-rotating, reciprocable sleeve disposed thereabout, a reaming tool comprising a central shaft having a driving end adapted for driving engagement with said driving member, a tapered shank section adjacent said driving end and a pilot section adjacent said shank section, stop means disposed on said shaft between said shank and said pilot sections, cutters slidably disposed on said shank, spring means surrounding said shaft engaging said stop means and said cutters to urge said cutters toward said driving end, a bushing slidably disposed on said shaft near the driving end, thrust bearing means slidably disposed on said shaft between said bushing and said sleeve adapted to transmit force from said sleeve to said cutters to urge them against said spring, spring loaded work guiding means surrounding said bushing and slidable thereon and hand operated work guiding means slidably disposed on said pilot section to hold the work in alignment with said cutters.

5. For use with a machine having a rotating driving member and a non-rotating reciprocable sleeve disposed thereabout, a reaming tool comprising a central shaft having a driving end adapted for driven relationship with said driving member, a triangular tapered shank section adjacent said driving end, ways formed on each side of said triangular section, and a pilot section adjacent said shank section, stop means disposed on said shaft between said shank and pilot sections, cutters slidably disposed on said ways, spring means surrounding said shaft engaging said stop means to urge said cutters toward said driving end, a bushing slidably disposed on said shaft near the driving end engaging said cutters, and thrust bearing means slidably disposed on said shaft between said bushing and said sleeve adapted to transmit force from said sleeve to said cutters to urge them against said spring.

6. A reaming tool of the expanding type adapted to be driven by external means, comprising a shaft having a driven end and a tapered shank, cutters slidably seated on said shank, said shaft being formed with a longitudinal hole extending from said driven end toward but not more than slightly into said shank, said driven end being formed to provide openings from said hole outwardly to the surface of said shaft, said shaft being formed to provide grooves extending from said openings longitudinally along said shank between said cutters, and a snug fitting sleeve engaging said cutters and surrounding said shaft at said driven end to cover the part of said grooves between said openings and said cutters and thereby form a passageway for lubricant from said driving means to be expelled along the edges of said cutters.

References Cited in the file of this patent

UNITED STATES PATENTS

| Number | Name | Date |
|---|---|---|
| 976,212 | Pugh et al. | Nov. 22, 1910 |
| 1,544,656 | Kylin | July 7, 1925 |
| 1,963,803 | Petzinger | June 19, 1934 |
| 1,989,476 | Evans | Jan. 29, 1935 |
| 2,030,846 | Bishton | Feb. 18, 1936 |
| 2,091,628 | Carlson | Aug. 31, 1938 |
| 2,348,874 | Andreasson | May 16, 1944 |
| 2,372,219 | Miller | Mar. 27, 1945 |
| 2,432,855 | Blazek | Dec. 16, 1947 |